United States Patent
Amritkar et al.

(10) Patent No.: US 12,468,626 B2
(45) Date of Patent: Nov. 11, 2025

(54) TECHNIQUES FOR GARBAGE COLLECTING ZONES IN A FILE SYSTEM

(71) Applicant: Lemon Inc., Grand Cayman (KY)

(72) Inventors: Prathamesh Amritkar, Los Angeles, CA (US); Peng Xu, Los Angeles, CA (US); Jinhyuk Kim, Los Angeles, CA (US); Kyoungryun Bae, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/633,248

(22) Filed: Apr. 11, 2024

(65) Prior Publication Data

US 2024/0256443 A1 Aug. 1, 2024

(51) Int. Cl.
 *G06F 12/02* (2006.01)

(52) U.S. Cl.
 CPC .................. *G06F 12/0253* (2013.01)

(58) Field of Classification Search
 None
 See application file for complete search history.

(56) References Cited

U.S. PATENT DOCUMENTS

| | | | | |
|---|---|---|---|---|
| 9,460,008 | B1 * | 10/2016 | Leshinsky | G06F 12/0253 |
| 10,996,863 | B1 * | 5/2021 | Kuzmin | G06F 12/0246 |
| 12,130,798 | B1 * | 10/2024 | Brahmadesam | G06F 3/065 |
| 2017/0139603 | A1 * | 5/2017 | Byun | G06F 3/0673 |
| 2017/0249969 | A1 * | 8/2017 | Aiello | G06F 3/0659 |
| 2021/0382818 | A1 * | 12/2021 | Sharma | G11C 11/5628 |
| 2022/0138099 | A1 * | 5/2022 | Kang | G06F 12/0253 711/154 |
| 2022/0171532 | A1 * | 6/2022 | Kang | G06F 3/064 |
| 2022/0365875 | A1 * | 11/2022 | Mao | G06F 3/0679 |
| 2022/0405001 | A1 * | 12/2022 | Xie | G06F 3/064 |
| 2023/0205460 | A1 | 6/2023 | Ishihara et al. | |
| 2025/0077091 | A1 * | 3/2025 | Park | G06F 3/0679 |

OTHER PUBLICATIONS

Extended European Search Report received for European Patent Application No. 24220642.3, mailed on Jun. 4, 2025, 11 pages.

Yu et al., "An Efficient Hot-Cold Data Separation Garbage Collection Algorithm Based on Logical Interval in NAND Flash-Based Consumer Electronics", IEEE Transactions On Consumer Electronics, vol. 69, No. 3, Aug. 2023, pp. 431-440.

\* cited by examiner

*Primary Examiner* — Eliyah S. Harper
(74) *Attorney, Agent, or Firm* — Astute IP Law Group

(57) ABSTRACT

Described are examples for performing garbage collection in a file system having multiple zones of data. A garbage rate associated with an amount of invalid data in the zone can be computed for each zone of the multiple zones in the file system. One or more candidate zones, of the multiple zones, can be determined for garbage collection based on the garbage rate and a sequence number assigned to the zone. Garbage collection of the one or more candidate zones in the file system can be performed.

20 Claims, 7 Drawing Sheets

TECHNIQUES FOR GARBAGE COLLECTING ZONES IN A FILE SYSTEM

BACKGROUND

The described aspects relate to file systems, and more particularly, mechanisms for performing garbage collection over zones of a file system.

Some file systems, such as ZenFS, store data in zones on a raw zoned block device. The zones can be logical constructs for storing data together along with metadata. The metadata can include properties associated with the zone, which may include indicators as to whether certain data in the zone is valid or invalid (e.g., overwritten an existing in a different zone or otherwise no longer relevant). Such file systems can store multiple files in a single zone by using an extent allocation scheme. A file can be composed of one or more extents and all the extents that compose that file can be stored in the same zone (or in different zones) of the device. When all file extents in a zone are invalidated, the zone can be reset and then reused to store new file extents. In some such file systems, when the storage capacity of the drive falls below a specific threshold, the file system can initiate garbage collection (GC) of zones. During GC, the file system can relocate valid data from one or more zones to other (e.g., newer) zones and can proceed to erase the one or more zones once only invalid data remains.

When selecting zones for GC, the file system can prioritize the zones based on the garbage rate metric, which can be a measure of invalid data compared to the total data in the zone. Current GC algorithms simply scan all the zones and pick the best candidate zone that has the maximum invalid data. In this way, the file system can free up the maximum space by GCing the zone with the highest amount of invalid data (and/or can rewrite the least amount of valid data). This algorithm, however, may have some drawbacks. First, current GC algorithms may not consider data hotness, where hotness can refer to how recently the data is written or rewritten—e.g., as the algorithm does not consider hotness and coldness of the data, it may always end up picking up the zones with hot data. In many workloads, zones containing hot data are frequently overwritten by the host. Therefore, the host itself may continue to invalidate the data, ultimately resulting in the entire zone being erased instead of undergoing GC. Second, current GC algorithms may result in increasing write amplification—e.g., without employing any intelligence, the file system may select zone candidates for GC that are already scheduled for complete erasure by the host, leading to an increase in write amplification. Third, current GC algorithms may result in lack of segregation between hot and cold data—e.g., as the algorithms solely select zone candidates based on the highest garbage rate, over time, zones can become a mixture of both hot and cold data. Consequently, garbage collection of such zones may result in increased write amplification.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a computer-implemented method for performing garbage collection in a file system having multiple zones of data is provided that includes computing, for each zone of the multiple zones in the file system, a garbage rate associated with an amount of invalid data in the zone, determining, based on the garbage rate and a sequence number assigned to each zone, one or more candidate zones, of the multiple zones, for garbage collection, and performing garbage collection of the one or more candidate zones in the file system.

In another example, an apparatus for performing garbage collection in a file system having multiple zones of data is provided that includes one or more processors and one or more non-transitory memories with instructions thereon. The instructions upon execution by the one or more processors, cause the one or more processors to compute, for each zone of the multiple zones in the file system, a garbage rate associated with an amount of invalid data in the zone, determine, based on the garbage rate and a sequence number assigned to each zone, one or more candidate zones, of the multiple zones, for garbage collection, and perform garbage collection of the one or more candidate zones in the file system.

In another example, one or more non-transitory computer-readable storage media are provided for storing instructions that when executed by one or more processors cause the one or more processors to execute a method for performing garbage collection in a file system having multiple zones of data. The method comprises computing, for each zone of the multiple zones in the file system, a garbage rate associated with an amount of invalid data in the zone, determining, based on the garbage rate and a sequence number assigned to each zone, one or more candidate zones, of the multiple zones, for garbage collection, and performing garbage collection of the one or more candidate zones in the file system.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

Figure 1:
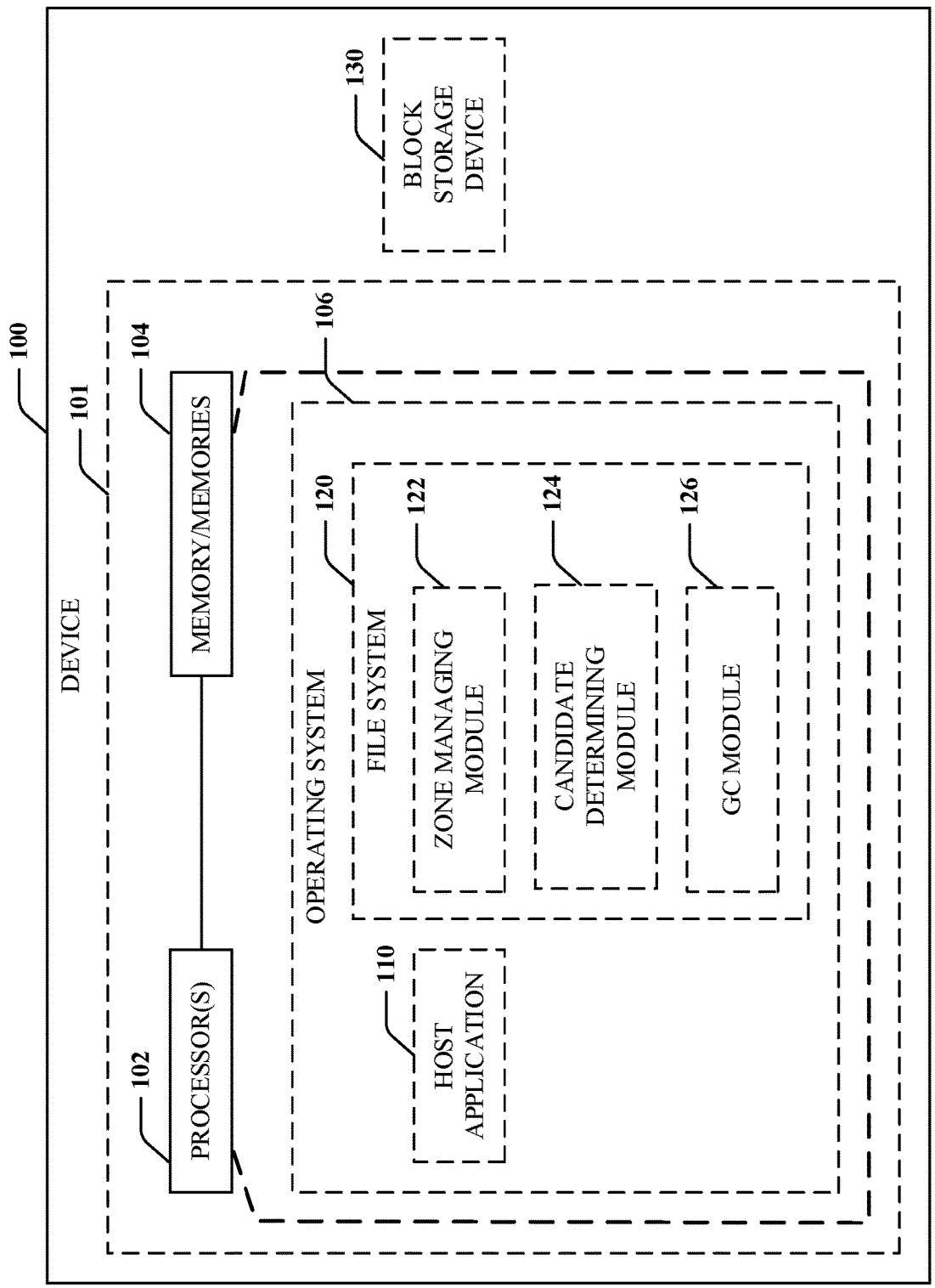
FIG. 1 is a schematic diagram of an example of a system for performing garbage collection (GC) in a file system, in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to performing garbage collection (GC) of one or more zones of a file system including selecting one or more candidate zones for GC based on a garbage rate associated with an amount of invalid data in the zone and a sequence number assigned to the zone. For example, a sequence number can be assigned to each zone to assist in determining candidate zones for GC. In one example, only zones that are not within a dwell time of a latest assigned zone may be considered for GC. The dwell time may be defined by the sequence number, such that only zones that are at least a dwell time number of sequence numbers from a last assigned sequence number can be considered as candidates for GC. Thus, the dwell time can represent a range of sequence numbers, from a sequence number of a latest assigned zone, to be avoided during GC. This can avoid GCing zones that include hot data (e.g., data that has recently been written or rewritten), which can avoid write amplification as in many cases the host application may consistently rewrite the hottest data. In another example, device capacity thresholds can be defined that impact how candidate selection is performed.

In one example, where a device executing the file system has a capacity less than a first threshold, a safe GC process can be used to select candidate zones for GC. In the safe GC process, multiple zones can be selected as candidate zones based on garbage rate and/or compliance with the dwell time. The multiple candidate zones can be refined based on other dimensions. One dimension may include whether the garbage rate of a given candidate zone is within a garbage rate gap of a candidate zone having a highest garbage rate, which can ensure that only candidate zones with a certain amount of garbage data relative to the highest amount of garbage data can be GCed. Another dimension may include whether the sequence number of a given candidate zone is within a sequence number gap of a candidate zone having a lowest sequence number, which can ensure that only zones having similar cold data are considered for GC. In another example, where a device executing the file system has a capacity less than a second threshold, which is less than the first threshold, a critical GC process can be used to select a candidate zone for GC. In the critical GC process, a zone with the highest garbage rate that also complies with the dwell time can be selected as the candidate zone for GC.

In accordance with aspects described herein, the modified GC process can use sequence numbers for zones to differentiate between hot and cold data, distinct thresholds for differentiated system actions upon triggering, dwell time, etc. Using a sequence number, in this regard and as described herein, can allow for more accurately assessing the hotness and coldness of data beyond just relying on lifetime hints that may be provided in metadata by the file system. For instance, when comparing two zones, if the one with a lower sequence number still contains valid data in contrast to a zone with a higher sequence number, the system can infer that the data in the lower sequence number zone is colder. As described, hotness and coldness of data can refer to how recently the data was appended in the file system (e.g., hotter data was appended sooner than colder data). In addition, in some examples, implementing thresholds for determining the GC process (e.g., critical and safe) can provide a mechanism to recognize a level of urgency for performing the GC. For example, in the critical GC process, the file system can ensure that the drive has enough space to accommodate new writes by choosing the zone with the highest garbage rate and the critical GC process may require less processing than the safe GC process and thus can be more efficient in a write-heavy scenario. In the safe GC process, the file system can demonstrate enhanced intelligence in selecting the GC candidate(s), as described above and further herein, which can allow for achieving improved GC compaction, improved segregation of hot and cold data, reduction in write amplification, etc. Using dwell time can serve to prevent selection of zones from the hot stream, giving enough time to the host to invalidate data, which can contribute to improvements in write amplification. In other examples described herein, the file system may maintain a separate GC zone stream, which may also help in segregation of hot and cold data.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processors may in combination execute the respective subset of instruction to accomplish performing actions X, Y, and Z. Alternatively, a single processor may execute the instructions stored on a single memory, or distributed across multiple memories, to accomplish performing actions X, Y, and Z.

Turning now to FIGS. 1-4, examples are depicted with reference to one or more components and one or more methods that may perform the actions or operations described herein, where components and/or actions/operations in dashed line may be optional. Although the operations described below in FIGS. 2 and 3A-3D are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a system for performing GC in a file system, in accordance with aspects described herein. The system includes a device 100 (e.g., a computing device) that includes processors(s) 102 (e.g., one or more processors) and/or memory/memories 104 (e.g., one or more memories). In an example, device 100 can include processor(s) 102 and/or memory/memories 104 configured to execute or store instructions or other parameters related to providing an operating system 106, which can execute one or more applications, services, etc. In another example, the device 100 can execute a host application 110, e.g., via operating system 106. For example, the host application 110 may include a user application that can create, modify, update, etc. data, which can be stored by a file system 120.

For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component 101), and/or the like. In other examples, processor(s) 102 can include multiple processors 102 of multiple devices 100, memory/memories 104 can include multiple memories 104 of multiple devices 100, etc. Memory/memories 104 may store instructions, parameters, data structures, etc., for use/execution by processor(s) 102 to perform functions described herein.

In addition, the device 100 can include substantially any device that can have a processor(s) 102 and memory/memories 104, such as a computer (e.g., workstation, server, personal computer, etc.), a personal device (e.g., cellular phone, such as a smart phone, tablet, etc.), a smart device, such as a smart television, and/or the like. Moreover, in an example, various components or modules of the device 100 may be within a single device, as shown.

In an example, the file system 120 can be a file system, such as ZenFS, that stores data in zones on a raw zoned block storage device 130. The zones can be defined as logical space on the block storage device 130 for storing data and/or associated metadata for the zone, where the metadata can include one or more parameters of the zone, such as an indication for each data in the zone indicating a valid or invalid status for the data. The block storage device 130 may include a hard disk drive (HDD), solid state drive (SSD), or substantially any form of memory (e.g., random access memory (RAM), read only memory (ROM), tapes, magnetic discs, optical discs, volatile memory, non-volatile memory, and any combination thereof), etc. The file system 120 can store data in a zone until the zone is full, and then can continue storing data in a next, or newly created, zone. In accordance with aspects described herein, file system 120 can assign a sequence number to newly created zones. In an example, data that is being overwritten or otherwise modified can be stored in a latest zone, and the previous data, which may be in a different zone, may be marked as invalid (e.g., in the zone metadata).

For example, the host application 110 can request storage of data in the file system 120, and the file system 120 can optionally include a zone managing module 122 for handling zone management and storage of the data, marking overwritten data as invalid, etc. In an example, host application 110 may also request or cause deletion of data from the file system 120, which may result in data being marked as invalid. The file system 120 may operate a separate GC process to delete invalid data to create space for new data (or corresponding zones). In another example, the file system 120 can optionally include a candidate determining module 124 for determining one or more candidate zones for GC, and/or a GC module 126 for performing GC on the one or more candidate zones.

Figure 2:
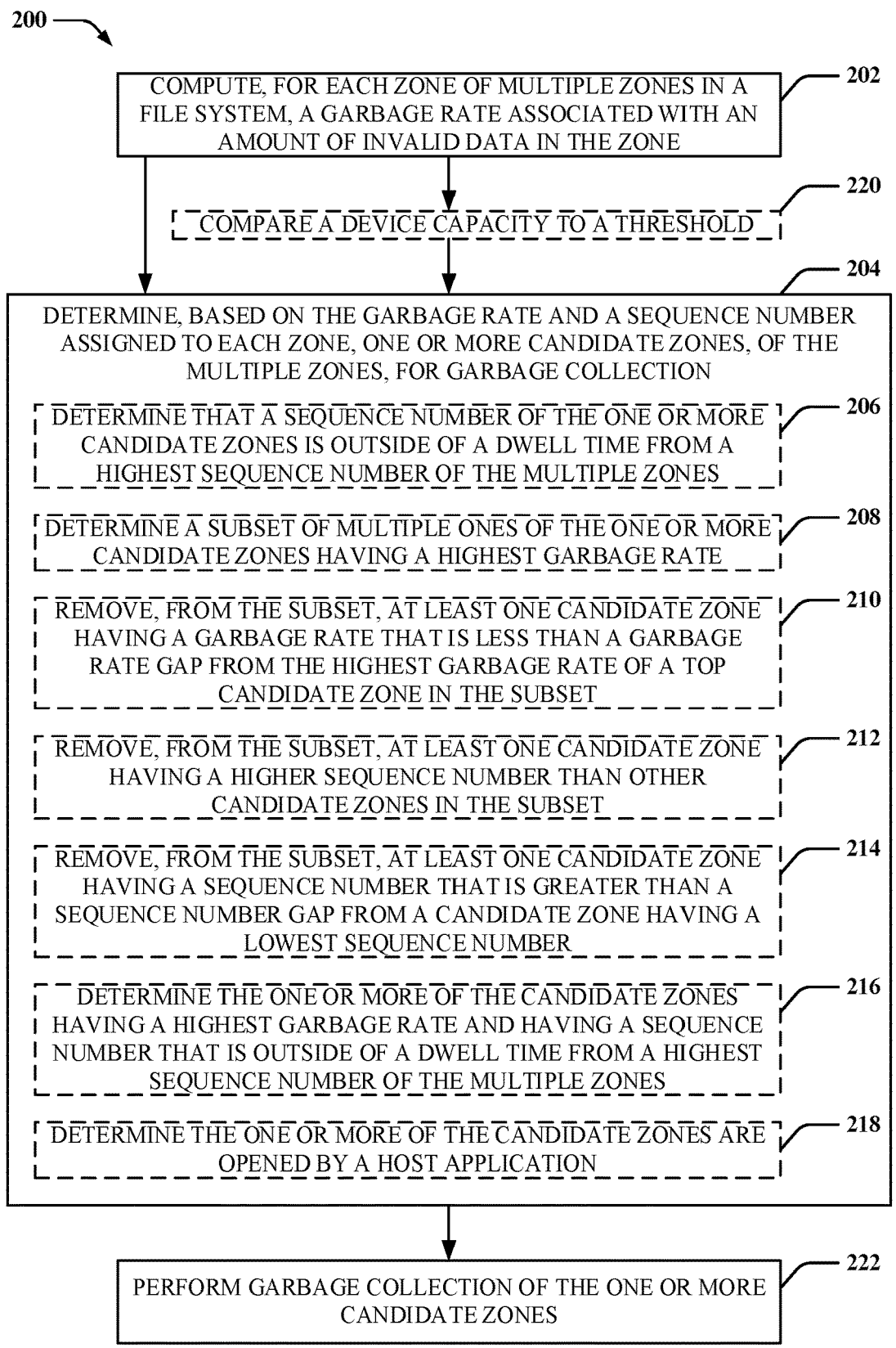
FIG. 2 is a flowchart of an example of a method for performing GC in a file system, in accordance with examples described herein.

FIG. 2 is a flowchart of an example of a method 200 for performing GC in a file system, in accordance with aspects described herein. For example, method 200 can be performed by a device 100 executing file system 120.

In method 200, at action 202, a garbage rate associated with an amount of invalid data in a zone can be computed for each zone of multiple zones in a file system. For example, zone managing module 122, e.g., in conjunction with processor(s) 102, memory/memories 104, operating system 106, file system 120, etc., can compute, for each zone of multiple zones in the file system (e.g., file system 120), the garbage rate associated with an amount of invalid data in the zone. For example, zone managing module 122 can compute the garbage rate periodically or as data in the zone is modified (e.g., added or marked as invalid), or as part of initiating a GC process, etc. In an example, zone managing module 122 can compute the garbage rate as, or based on, a size of data marked as invalid in the zone, a ratio of invalid data to total data (or to valid data), etc. Zone managing module 122 can determine the amount of invalid data in a zone based on zone metadata, which may indicate for each data in the zone whether the data is valid or invalid.

In method 200, at action 204, one or more candidate zones, of the multiple zones, can be determined for garbage collection based on the garbage rate and a sequence number assigned to each zone. For example, candidate determining module 124, e.g., in conjunction with processor(s) 102, memory/memories 104, operating system 106, file system 120, etc., can determine, based on the garbage rate and a sequence number assigned to each zone, one or more candidate zones, of the multiple zones, for GC. For example, candidate determining module 124 can analyze the garbage rate for each zone, which can be subject to one or more dimensions as described herein, and/or the sequence number of each zone to determine which zones to consider for GC. As described, for example, file system 120 can assign sequence numbers to zones as they are created (e.g., at a time each zone is created) for storing data, such that the sequence number is incremented for each zone. For example, file system 120 can assign sequence number zero or one to a first created zone, and can then assign incrementally increasing numbers to each subsequently created zone. In this regard, zones having higher sequence numbers can correspond to more recently created zones that may include "hotter" data, as compared to zones having lower sequence numbers that correspond to older zones that may include "colder" data. Using the sequence number can allow for not GCing hot data that may otherwise be overwritten called for GC by the host application 110.

In determining the one or more candidate zones at action 204, optionally at action 206, it can be determined that a sequence number of the one or more candidate zones is outside a swell time from a highest sequence number of the multiple zones. For example, candidate determining module 124, e.g., in conjunction with processor(s) 102, memory/memories 104, operating system 106, file system 120, etc., can determine that the sequence number of the one or more candidate zones is outside of the dwell time from the highest sequence number of the multiple zones. In an example, the dwell time can be configured in the file system 120, may be configured by the host application 110, etc. The dwell time can be configured in terms of a number of sequence numbers, such that candidate determining module 124 can verify that the one or more candidate zones are not within the number of sequence numbers from a sequence number of a last created zone. If a zone is within the dwell time, candidate determining module 124 may exclude the zone from being a candidate zone.

For example, the sequence number can be a global number that gets incremented every time a new zone is opened, and can be part of a zone structure (and can be power safe such to persist in the event of power failure). The dwell time can signify a duration during which the GC process refrains from selecting a candidate zone for a designated time frame, represented by the sequence number. For instance, candidate determining module 124 may decide not to consider a zone candidate for the latest n sequence numbers, where n is a positive integer. In this example, the fixed duration can be referred to as the "dwell time," which is set at n. In an example, the dwell time may be considered only for the zones that have live writes or hot streams, and not for GC streams, where a GC stream may include data that was migrated as part of GCing the zone in which the data previously resided.

In determining the one or more candidate zones at action 204, optionally at action 208, the candidate zones can include multiple candidate zones, and a subset of multiple ones of the one or more candidate zones having a highest garbage rate can be determined. For example, candidate determining module 124, e.g., in conjunction with processor(s) 102, memory/memories 104, operating system 106, file system 120, etc., can iterate through the multiple zones (or at least the multiple zones that are outside of the dwell time) to determine the subset of multiple ones of the one or more candidate zones having a highest garbage rate (e.g., among the multiple zones or at least the multiple zones that are outside of the dwell time). In an example, candidate determining module 124 can determine the subset to include a fixed number of candidate zones and/or may order the subset from highest garbage rate to lowest garbage rate. As described, the garbage rate for each zone can be computed by the zone managing module 122 (e.g., at action 202), stored in zone metadata, and/or the like.

In determining the one or more candidate zones at action 204, optionally at action 210, at least one candidate zone having a garbage rate that is less than a garbage rate gap from the highest garbage rate of a top candidate zone in the subset can be removed from the subset. For example, candidate determining module 124, e.g., in conjunction with processor(s) 102, memory/memories 104, operating system 106, file system 120, etc., can remove, from the subset, at least on candidate zone having a garbage rate that is less than a garbage rate gap from the highest garbage rate of a top candidate zone in the subset. In this regard, for example, file system 120, or host application 110, can define a garbage rate gap as a maximum gap between the garbage rates of a candidate zone having the highest garbage rate (and being outside of the dwell time) and other candidate zones in the subset being considered for GC. Thus, the wherein the garbage rate gap can represent a range of garbage rate from the highest garbage rate to considered in garbage collection. In an example, the garbage rate gap can be configured by file system 120. For example, the garbage rate gap can refer to the allowable percentage difference considered when comparing GC candidate zones. Candidate zones having a garbage rate beyond this threshold may not be considered for GC. In some examples. this dimension can have highest priority among any other dimensions as it can avoid write amplification. For example, if the garbage rate gap is 10%, and the top candidate in the subset being considered for GC has a garbage rate of 60%, the subset of candidate zones being considered are to have at least a 50% garbage rate.

In determining the one or more candidate zones at action 204, optionally at action 212, at least one candidate zone having a higher sequence number than other candidate zones in the subset can be removed from the subset. For example, candidate determining module 124, e.g., in conjunction with processor(s) 102, memory/memories 104, operating system 106, file system 120, etc., can remove, from the subset, at least one candidate zone having a higher sequence number than other candidate zones in the subset. In an example, candidate determining module 124 can remove one or more candidate zones from the subset that have highest sequence numbers to generate the subset to be if a certain size, or to ensure that a certain difference in sequence numbers is present in the subset.

In determining the one or more candidate zones at action 204, optionally at action 214, at least one candidate zone having a sequence number that is greater than a sequence number gap from a candidate zone having a lowest sequence number can be removed from the subset. For example, candidate determining module 124, e.g., in conjunction with processor(s) 102, memory/memories 104, operating system 106, file system 120, etc., can remove, from the subset, at least one candidate zone having a sequence number that is greater than a sequence number gap from a candidate zone of the subset having a lowest sequence number. This can ensure the candidate zones are within a sequence number gap from the lowest sequence number present in the subset. For example, the sequence number gap can represent a range of sequence numbers from the lowest sequence number to be considered in garbage collection. In an example, the sequence number gap can be configured by the file system 120. The sequence number gap can represent a range considered after identifying the top GC candidate based on their garbage rate. Candidates within this sequence number gap are deemed to have similar cold data, and the one with the lowest sequence number can be prioritized for GC.

In determining the one or more candidate zones at action 204, optionally at action 216, the one or more candidate zones having a highest garbage rate and having a sequence number that is outside of a dwell time from a highest sequence number of the multiple zones can be determined. For example, candidate determining module 124, e.g., in conjunction with processor(s) 102, memory/memories 104, operating system 106, file system 120, etc., can determine the one or more of the candidate zones having a highest garbage rate and having a sequence number that is outside of the dwell time from the highest sequence number of the multiple zones. The highest sequence number of the multiple zones can correspond to a last added zone. As described, the candidate zone(s) for GC can be outside of the dwell time from this last added zone. Accordingly, in this example, the one or more candidate zones (e.g., a single zone or a set of zones) outside of the dwell time having the highest garbage rate can be selected for GC.

In determining the one or more candidate zones at action 204, optionally at action 218, it can be determined that the one or more candidate zones are opened by the host application. For example, candidate determining module 124, e.g., in conjunction with processor(s) 102, memory/memories 104, operating system 106, file system 120, etc., can determine the one or more of the candidate zones are opened by the host application 110. In an example, zones can be created by the file system 120 for relocating data from GCed zones, and zones can also be created (e.g., opened) by the host application 110 for storing or rewriting data. In an example, candidate determining module 124 can differentiate between these zones and can disregard zones created by the file system 120 (and not by or behalf of the host application 110) in determining the candidate zones for GC. In one example, the zones opened by the file system 120 for relocating data can be considered a GC stream, and the GC stream can be avoided in determining candidate zones for GC. In some file systems, the migration of extents takes into account only lifetime hints, resulting in a mixture of zones containing both hot and cold data. This may significantly impede GC compaction. Using the GC stream in this regard to write migrated extents may avoid the compaction issue.

In method 200, optionally at action 220, a device capacity can be compared to a threshold. For example, candidate determining module 124, e.g., in conjunction with processor(s) 102, memory/memories 104, operating system 106, file system 120, etc., can compare the device capacity (e.g., a capacity of block storage device 130) to a threshold. In an example, candidate determining module 124 can perform this comparison in determining which of actions 206, 208, 210, 212, 214, 216, and/or 218 to perform to determine the one or more candidate blocks for GC. In one example, candidate determining module 124 can compare the device capacity to a first threshold (e.g., a safe threshold), and if the device capacity is less than the safe threshold but greater than a second threshold (e.g., a critical threshold), candidate determining module 124 can determine to perform certain actions to determine the candidate zones, such as actions 206, 208, 210, 212, and/or 214. In another example, candidate determining module 124 can compare the device capacity to the second threshold (e.g., the critical threshold), and if the device capacity is less than the critical threshold, candidate determining module 124 can determine to perform certain actions to determine the candidate zones, such as actions 206 and/or 216.

In method 200, at action 222, garbage collection of the one or more candidate zones can be performed. For example, GC module 126, e.g., in conjunction with processor(s) 102, memory/memories 104, operating system 106, file system 120, etc., can perform the GC of the one or more candidate zones. In an example, GC module 126 can start with the first (e.g., highest ranked) candidate zone in a subset of multiple zones, or can take the zone with the highest garbage rate that is outside of the dwell time, and perform GC on the zone, and then may move to a next zone if a subset of multiple zones are determined as candidate zones. As described, performing GC can include relocating valid data to another zone (e.g., a last added zone), which may include opening another zone, and then removing or deleting the zone once only invalid data remains.

FIGS. 3A-3D are a flowchart of a specific example of a method 300 for determining candidate zones for GC in a file system, in accordance with aspects described herein. For example, method 300 can be performed by a device 100 executing file system 120.

Figure 3A:
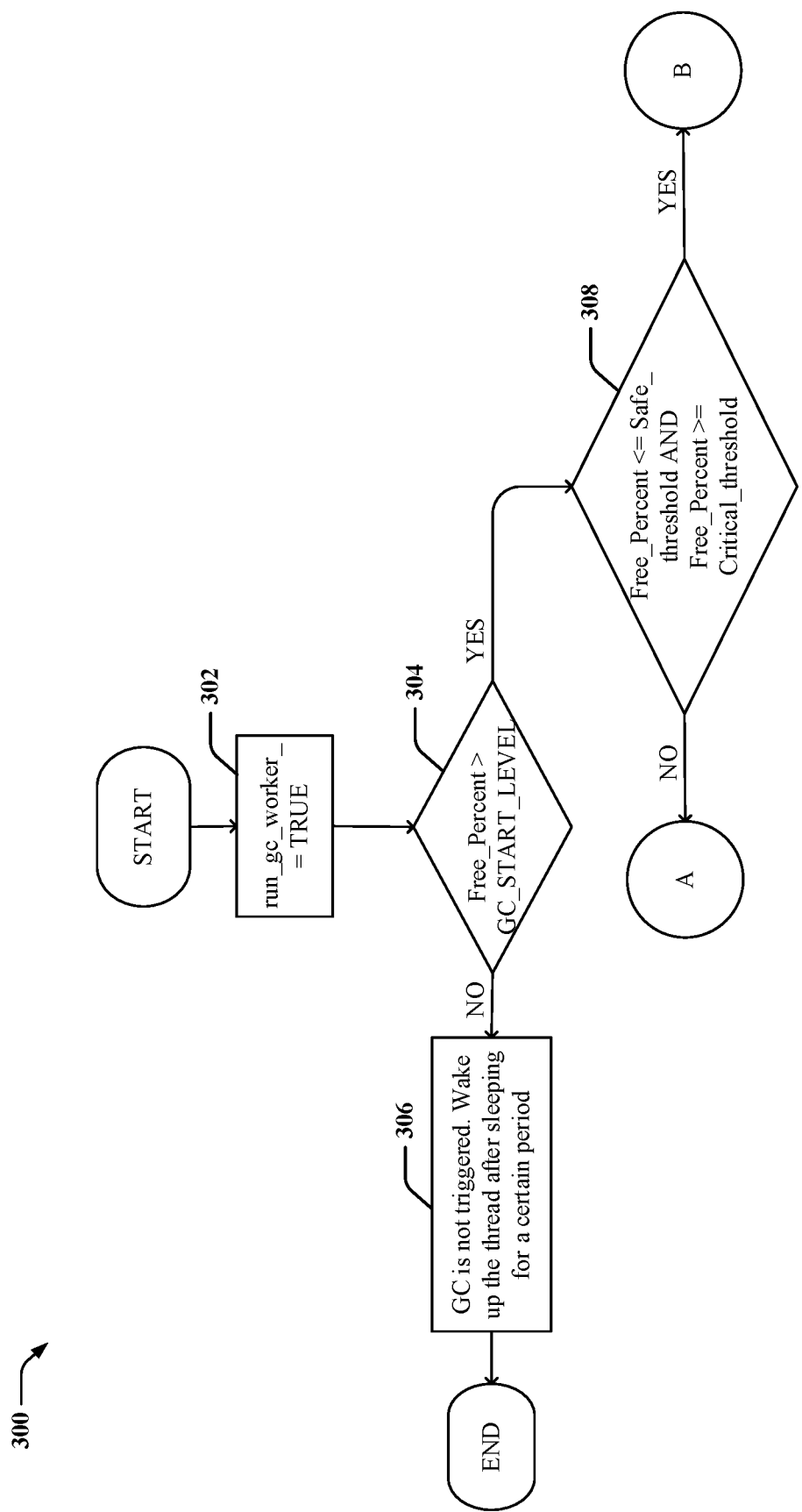
FIGS. 3A-3D are a flowchart of a specific example of a method for determining candidate zones for GC in a file system, in accordance with aspects described herein.

Referring to FIG. 3A, in method 300, at 302, a flag run_gc_worker can be set=TRUE. This can be a flag set by the file system 120 to activate the GC process. At 304, it can be determined (e.g., by the file system 120, zone maintaining module 122, etc.) whether Free_Percent>GC_START_LEVEL. For example, the Free_Percent can be a block storage device 130 capacity measurement, and the GC_START_LEVEL can be a threshold by which to begin GC. If not, at 306, GC is not triggered and the thread that executes the GC process can be woken after sleeping for a certain period. If Free_Percent>GC_START_LEVEL, at 308, it can be determined (e.g., by the file system 120, candidate determining module 124, etc.) whether Free_Percent<=Safe_threshold AND Free_Percent>=Critical_threshold. As described, for example, the Safe_threshold can be a threshold by which to execute the safe GC process (continuing to B in FIGS. 3C and 3D) if the Free_Percent is also at least meets the Critical_threshold. The Critical_threshold can be less than the Safe_threshold and can cause executing of the critical GC process (continuing to A in FIG. 3B).

Figure 3B:
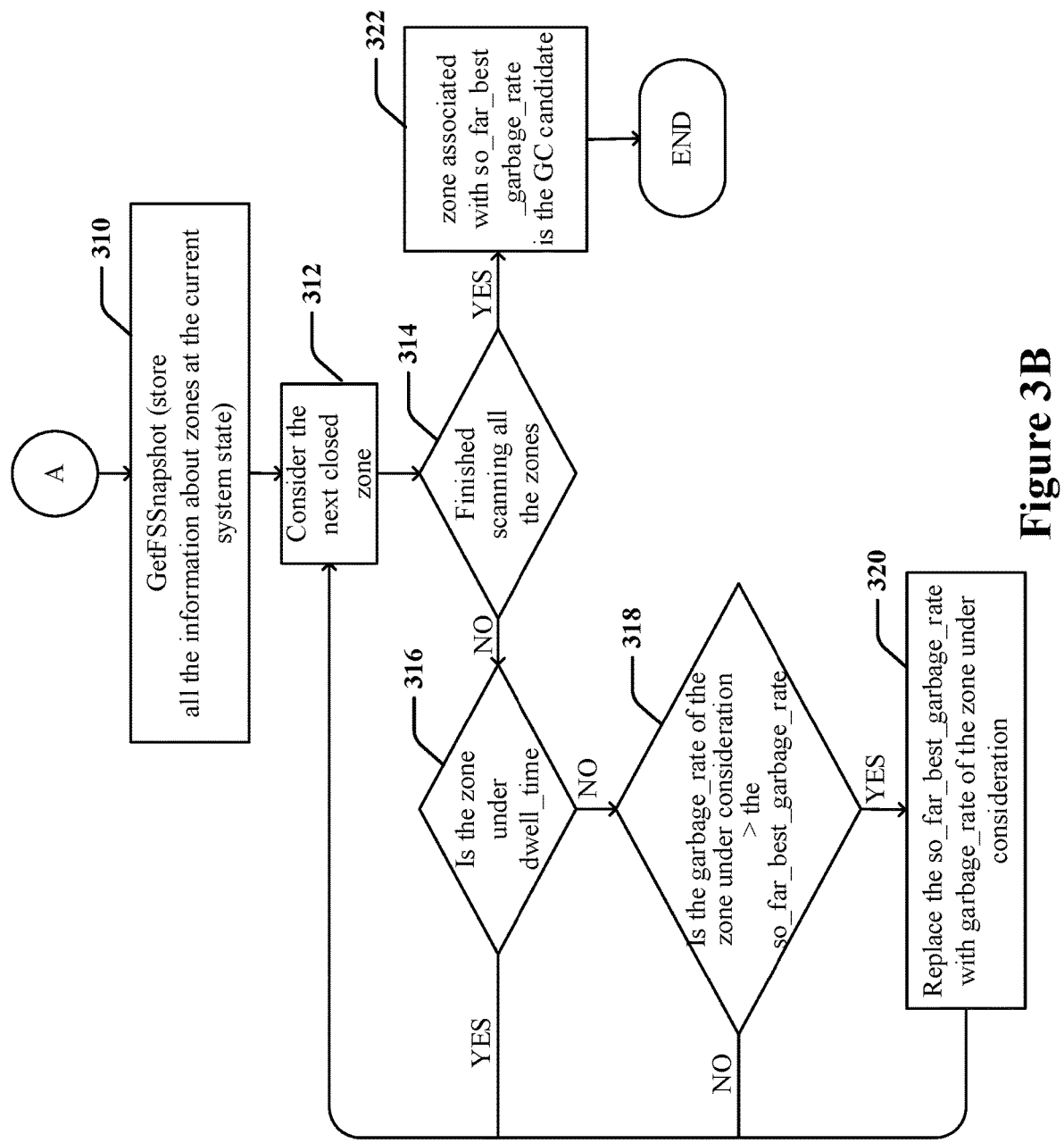

Referring to FIG. 3B (e.g., for the critical GC process), at 310, GetFSSnapshot can be executed (e.g., by the file system 120, candidate determining module 124, etc.) to obtain a file system snapshot (e.g., store all the information about zones at the current system state). This may include obtaining and storing (e.g., in memory) a garbage rate, sequence number, etc. of each zone in the file system at the snapshot time. At 312, a next closed zone can be considered (e.g., by the file system 120, candidate determining module 124, etc.), which can be part of iterating through all zones from the snapshot. At 314, it can be determined (e.g., by the file system 120, candidate determining module 124, etc.) whether scanning all the zones is finished. If not, at 316, it can be determined (e.g., by the file system 120, candidate determining module 124, etc.) whether the zone is under the dwell_time. If so, the next closed zone can be considered at 312. If not (e.g., if the zone is outside of the dwell_time as described herein), at 318, it can be determined (e.g., by the file system 120, candidate determining module 124, etc.) if the garbage rate of the zone under consideration is greater than the so_far_best_garbage_rate. If not, the next closed zone can be considered at 312. If so, at 320, the so_far_best_garbage_rate can be replaced (e.g., by the file system 120, candidate determining module 124, etc.) with the garbage_rate of the zone under consideration. If finished scanning all zones at 314, at 322, the zone associated with a so_far_best_garbage_rate can be set (e.g., by the file system 120, candidate determining module 124, etc.) as the GC candidate. In this example, in the critical GC process, one zone can be selected as the candidate zone for GC.

Figure 3C:
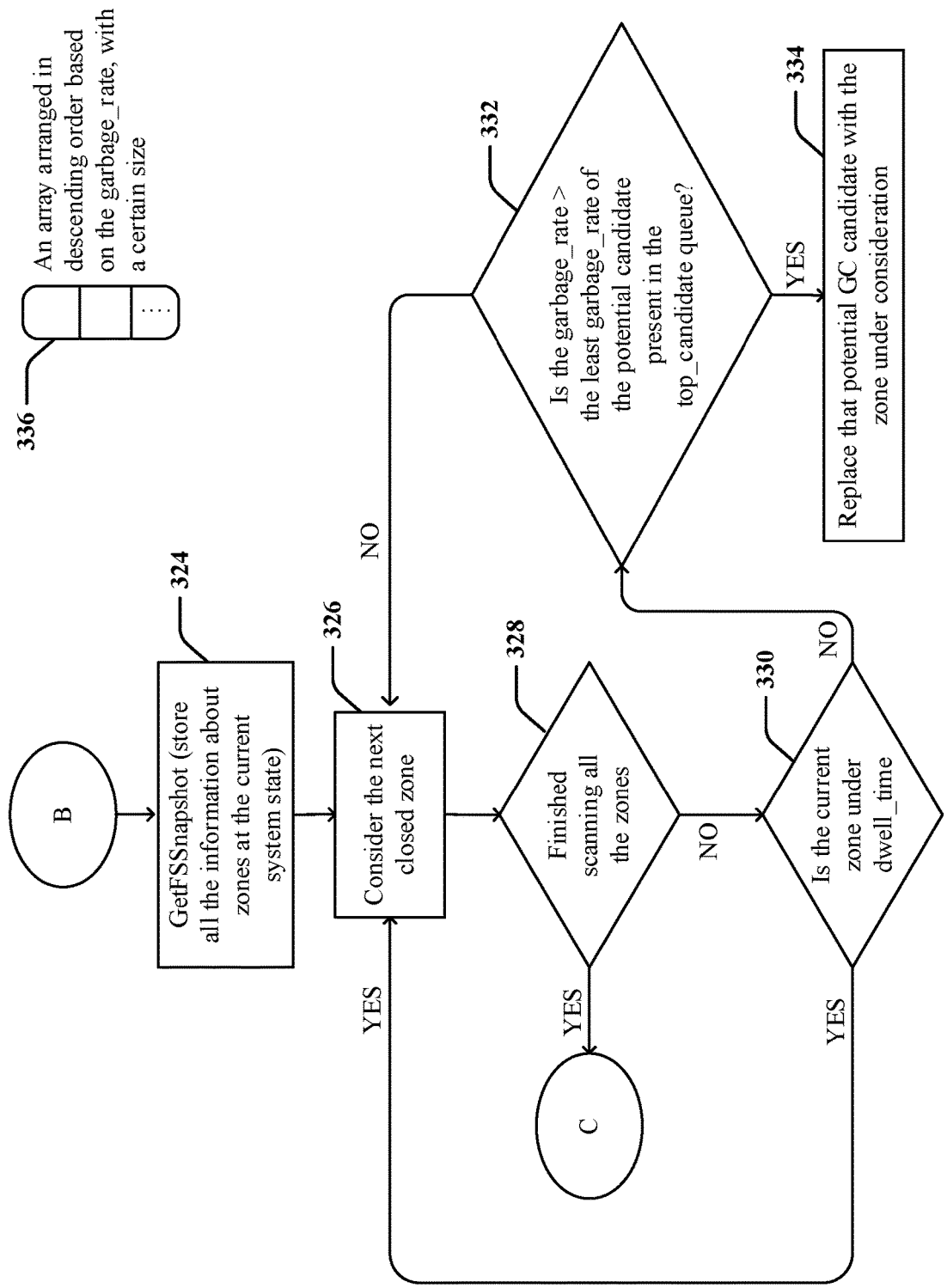

Referring to FIG. 3C (e.g., for the safe GC process), at 324, GetFSSnapshot can be executed (e.g., by the file system 120, candidate determining module 124, etc.) to obtain a file system snapshot (e.g., store all the information about zones at the current system state). This may include obtaining and storing (e.g., in memory) a garbage rate, sequence number, etc. of each zone in the file system at the snapshot time. At 326, a next closed zone can be considered (e.g., by the file system 120, candidate determining module 124, etc.), which can be part of iterating through all zones from the snapshot. At 328, it can be determined (e.g., by the file system 120, candidate determining module 124, etc.) whether scanning all the zones is finished. If so, method 300 can continue to C in FIG. 3D. If not, at 330, it can be determined (e.g., by the file system 120, candidate determining module 124, etc.) whether the zone is under the dwell_time. If so, the next closed zone can be considered at 326. If not (e.g., if the zone is outside of the dwell_time as described herein), at 332, it can be determined (e.g., by the file system 120, candidate determining module 124, etc.) if the garbage_rate is greater than the least garbage_rate of the potential candidate present in the top_candidate queue. If not (e.g., and the top_candidate queue is full), the next closed zone can be considered at 326. If so (e.g., and the top_candidate queue is full), at 334, the potential GC candidate having the least garbage rate in the top_candidate queue can be replaced (e.g., by the file system 120, candidate determining module 124, etc.) with the zone under consideration. During and/or after this process, the top_candidate queue 336 is generated as an array arranged in descending order based on the garbage_rate with a certain size.

Figure 3D:
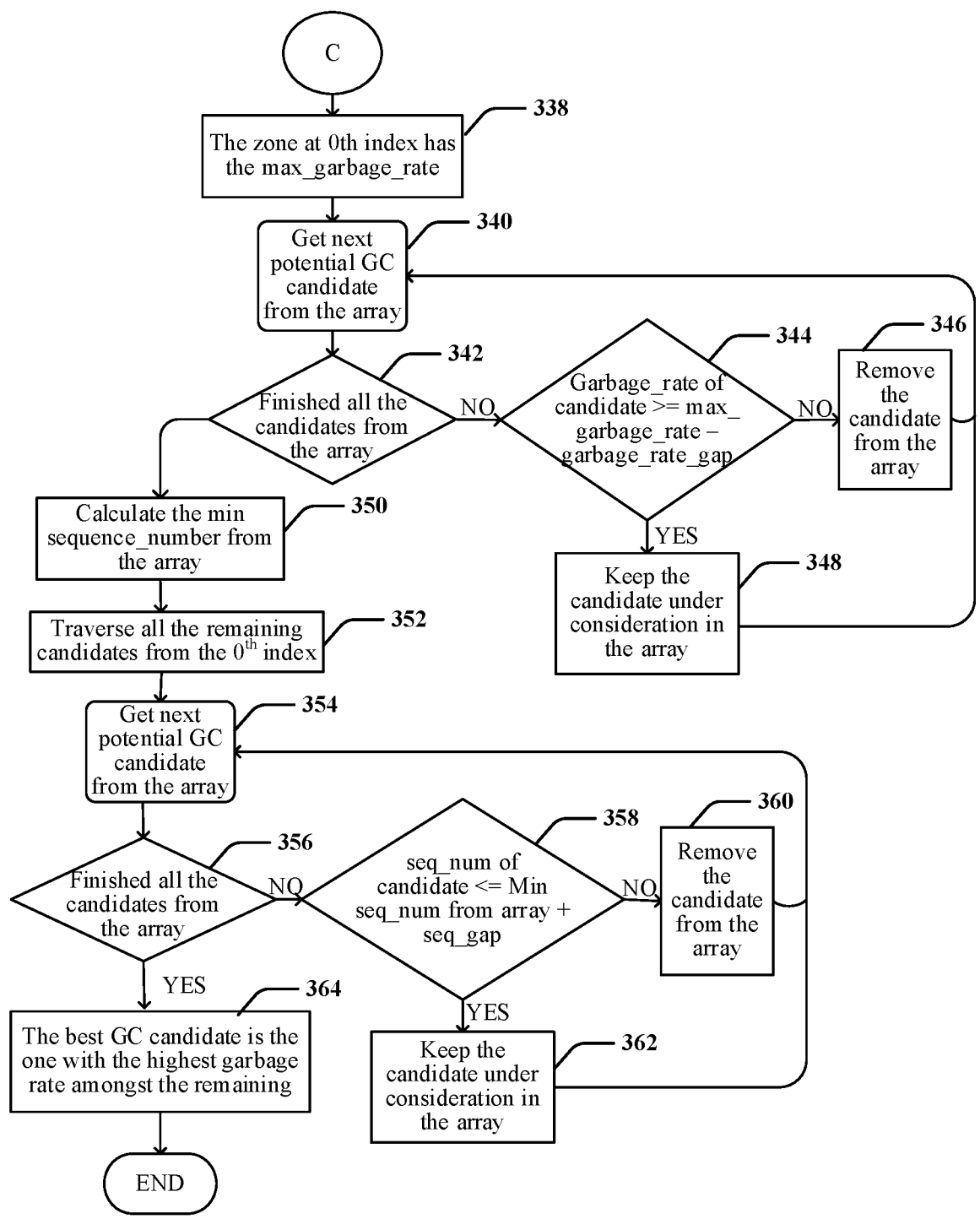

Referring to FIG. 3D, if scanning all the zones at 328 in FIG. 3C is finished, at 338, the zone at the 0th index (e.g., the first zone) in the top_candidate queue, can have the max_garbage_rate. At 340, the next potential GC candidate can be obtained from the array (e.g., by the file system 120, candidate determining module 124, etc.). At 342, it can be determined whether the file system 120, candidate determining module 124, etc. is finished with all candidates from the array (e.g., the top_candidate queue). If not, at 344, it can be determined (e.g., by the file system 120, candidate determining module 124, etc.) if the garbage_rate of the current candidate is at least the max_garbage_rate minus the garbage_rate_gap. If not, at 346, the file system 120, candidate determining module 124, etc. can remote the candidate from the array and get the next potential GC candidate from the array at 340. If the garbage_rate of the current candidate is at least the max_garbage_rate minus the garbage_rate_gap, at 348, the candidate can be kept (e.g., by the file system 120, candidate determining module 124, etc.) under consideration in the array. If the file system 120, candidate determining module 124, etc. is finished evaluating the candidates in the array at 342, at 350, the minimum sequence number can be calculated from the zones in the array (e.g., by the file system 120, candidate determining module 124, etc.).

At 352, the remaining candidate zones can be traversed as follows. At 354, the file system 120, candidate determining module 124, etc. can obtain a next potential GC candidate from the array. At 356, it can be determined if the file system 120, candidate determining module 124, etc. is finished with all the candidate zones from the array. If not, at 358, it can be determined (e.g., by the file system 120, candidate determining module 124, etc.) if the sequence number of the candidate being considered is less than or equal to the minimum sequence number in the array added to the sequence gap. If not, at 360, the candidate can be removed from the array (e.g., by the file system 120, candidate determining module 124, etc.). If so, at 362, the candidate can be kept under consideration in the array (e.g., by the file system 120, candidate determining module 124, etc.). If the file system 120, candidate determining module 124, etc. is finished with all candidates from the array, at 356, at 364, the best GC candidate in the array can be the one with the highest garbage rate among the remaining zones. In an example, at least this best GC candidate (and/or the other GC candidates in the array) can be GCed. In one example, the candidate zones from the array can be GCed in order of the array.

Figure 4:
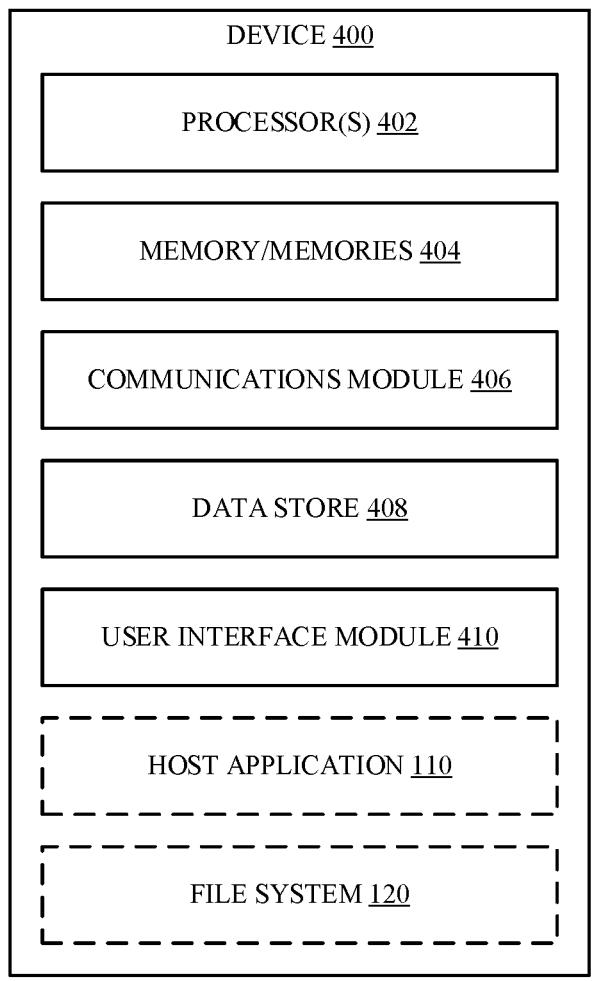
FIG. 4 is a schematic diagram of an example of a device for performing functions described herein.

FIG. 4 illustrates an example of device 400, similar to or the same as device 100 (FIG. 1), including additional optional component details as those shown in FIG. 1. In one implementation, device 400 may include processor(s) 402, which may be similar to processor(s) 102 for carrying out processing functions associated with one or more of components and functions described herein. Processor(s) 402 can include a single or multiple set of processors or multi-core processors. Moreover, processor(s) 402 can be implemented as an integrated processing system and/or a distributed processing system.

Device 400 may further include memory/memories 404, which may be similar to memory/memories 104 such as for storing local versions of applications being executed by processor(s) 402, host application 110, file system 120, related modules, instructions, parameters, etc. Memory/memories 404 can include a type of memory usable by a computer, such as RAM, ROM, tapes, magnetic discs, optical discs, volatile memory, non-volatile memory, and any combination thereof.

Further, device 400 may include a communications module 406 that provides for establishing and maintaining communications with one or more other devices, parties, entities, etc., utilizing hardware, software, and services as described herein. Communications module 406 may carry communications between modules on device 400, as well as between device 400 and external devices, such as devices located across a communications network and/or devices serially or locally connected to device 400. For example, communications module 406 may include one or more buses, and may further include transmit chain modules and receive chain modules associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with implementations described herein. For example, data store 408 may be or may include a data repository for applications and/or related parameters (e.g., host application 110, file system 120, related modules, instructions, parameters, etc.) being executed by, or not currently being executed by, processor(s) 402. In one example, data store 408 can include a block storage device 130. In addition, data store 408 may be a data repository for host application 110, file system 120, related modules, instructions, parameters, etc., and/or one or more other modules of the device 400.

Device 400 may include a user interface module 410 operable to receive inputs from a user of device 400 and further operable to generate outputs for presentation to the user. User interface module 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface module 410 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for performing garbage collection, in a file system having multiple zones of data, using sequence numbers assigned to the multiple zones to assess hotness or coldness of the data, comprising:
   computing, for each zone of the multiple zones in the file system, a garbage rate associated with an amount of invalid data in the zone;
   determining, based on the garbage rate and a sequence number assigned to each zone, one or more candidate zones, of the multiple zones, for garbage collection to prioritize garbage collection of zones having colder data than other zones, wherein the sequence number is assigned to each zone at a time the zone is created for storing data; and
   performing garbage collection of the one or more candidate zones in the file system.

2. The computer-implemented method of claim 1, wherein determining the one or more candidate zones includes determining that the sequence number of the one or more candidate zones is outside of a dwell time from a highest sequence number of the multiple zones, wherein the dwell time represents a range of sequence numbers, from the highest sequence number, which corresponds to a latest assigned zone, to be avoided during garbage collection.

3. The computer-implemented method of claim 1, wherein the one or more candidate zones includes multiple candidate zones, and wherein determining the multiple candidate zones includes:
   determining a subset of multiple ones of the one or more candidate zones having a highest garbage rate; and
   removing, from the subset of multiple ones of the one or more candidate zones, at least one candidate zone having a garbage rate that is less than a garbage rate gap from the highest garbage rate of a top candidate zone in the subset, wherein the garbage rate gap is configured by the file system and represents a range of garbage rate from the highest garbage rate to be considered in garbage collection.

4. The computer-implemented method of claim 3, wherein performing the determining of the multiple candidate zones is based at least in part on determining that a capacity of the file system achieves a threshold.

5. The computer-implemented method of claim 1, wherein the one or more candidate zones includes multiple candidate zones, and wherein determining the multiple candidate zones includes:
   determining a subset of multiple ones of the one or more candidate zones having a highest garbage rate; and removing, from the subset of multiple ones of the one or more candidate zones, at least one candidate zone having a higher sequence number than other candidate zones in the subset to prioritize garbage collecting zones with colder data.

6. The computer-implemented method of claim 5, wherein performing the determining of the multiple candidate zones is based at least in part on determining that a capacity of the file system achieves a threshold.

7. The computer-implemented method of claim 1, wherein the one or more candidate zones includes multiple candidate zones, and wherein determining the multiple candidate zones includes:
   determining a subset of multiple ones of the one or more candidate zones having a highest garbage rate; and
   removing, from the subset of multiple ones of the one or more candidate zones, at least one candidate zone having a sequence number that is greater than a sequence number gap from a candidate zone in the subset having a lowest sequence number, wherein the sequence number gap is configured by the file system and represents a range of sequence numbers from the lowest sequence number to be considered in garbage collection.

8. The computer-implemented method of claim 7, wherein performing the determining of the multiple candidate zones is based at least in part on determining that a capacity of the file system achieves a threshold.

9. The computer-implemented method of claim 1, wherein determining the one or more candidate zones includes determining the one or more candidate zones having a highest garbage rate and having a sequence number that is outside of a dwell time from a highest sequence number of the multiple zones, wherein the dwell time represents a range of sequence numbers, from the highest sequence number, which corresponds to a latest assigned zone, to be avoided during garbage collection.

10. The computer-implemented method of claim 9, wherein determining the one or more candidate zones is based at least in part on determining that a capacity of the file system achieves a threshold.

11. The computer-implemented method of claim 1, wherein determining the one or more candidate zones includes determining that the one or more candidate zones are opened by a host application, such that zones opened by the file system for rewriting valid data are not considered for garbage collection.

12. An apparatus for performing garbage collection in a file system having multiple zones of data, the apparatus comprising one or more processors and one or more non-transitory memories with instructions thereon, wherein the instructions upon execution by the one or more processors, cause the one or more processors to:
   compute, for each zone of the multiple zones in the file system, a garbage rate associated with an amount of invalid data in the zone;
   determine, based on the garbage rate and a sequence number assigned to each zone, one or more candidate zones, of the multiple zones, for garbage collection; and
   perform garbage collection of the one or more candidate zones in the file system.

13. The apparatus of claim 12, wherein the instructions upon execution by the one or more processors, cause the one or more processors to determine the one or more candidate zones at least in part by determining that the sequence number of the one or more candidate zones is outside of a dwell time from a highest sequence number of the multiple zones.

14. The apparatus of claim 12, wherein the one or more candidate zones includes multiple candidate zones, and wherein the instructions upon execution by the one or more processors, cause the one or more processors to determine the multiple candidate zones at least in part by:
   determining a subset of multiple ones of the one or more candidate zones having a highest garbage rate; and
   removing, from the subset of multiple ones of the one or more candidate zones, at least one candidate zone having a garbage rate that is less than a garbage rate gap from the highest garbage rate of a top candidate zone in the subset.

15. The apparatus of claim 12, wherein the one or more candidate zones includes multiple candidate zones, and wherein the instructions upon execution by the one or more processors, cause the one or more processors to determine the multiple candidate zones at least in part by:
   determining a subset of multiple ones of the one or more candidate zones having a highest garbage rate; and
   removing, from the subset of multiple ones of the one or more candidate zones, at least one candidate zone having a higher sequence number than other candidate zones in the subset.

16. The apparatus of claim 12, wherein the one or more candidate zones includes multiple candidate zones, and wherein the instructions upon execution by the one or more processors, cause the one or more processors to determine the multiple candidate zones at least in part by:
   determining a subset of multiple ones of the one or more candidate zones having a highest garbage rate; and
   removing, from the subset of multiple ones of the one or more candidate zones, at least one candidate zone having a sequence number that is greater than a sequence number gap from a candidate zone in the subset having a lowest sequence number.

17. The apparatus of claim 12, wherein the instructions upon execution by the one or more processors, cause the one or more processors to determine the one or more candidate zones at least in part by determining the one or more candidate zones having a highest garbage rate and having a sequence number that is outside of a dwell time from a highest sequence number of the multiple zones.

18. The apparatus of claim 12, wherein the instructions upon execution by the one or more processors, cause the one or more processors to determine the one or more candidate zones at least in part by determining that the one or more candidate zones are opened by a host application.

19. One or more non-transitory computer-readable storage media storing instructions that when executed by one or more processors cause the one or more processors to execute a method for performing garbage collection in a file system having multiple zones of data, wherein the method comprises:
   computing, for each zone of the multiple zones in the file system, a garbage rate associated with an amount of invalid data in the zone;
   determining, based on the garbage rate and a sequence number assigned to each zone, one or more candidate zones, of the multiple zones, for garbage collection; and
   performing garbage collection of the one or more candidate zones in the file system.

20. The one or more non-transitory computer-readable storage media of claim 19, wherein determining the one or more candidate zones includes determining that the sequence number of the one or more candidate zones is outside of a dwell time from a highest sequence number of the multiple zones.

* * * * *